US009712889B2

(12) United States Patent
Zhu et al.

(10) Patent No.: US 9,712,889 B2
(45) Date of Patent: Jul. 18, 2017

(54) SEAMLESS TRICK-MODE WITH DECREASED LATENCY FOR LIVE TRANSCODE STREAMING

(71) Applicant: BROADCOM CORPORATION, Irvine, CA (US)

(72) Inventors: Hongtao Zhu, San Jose, CA (US); Alexander Garland MacInnis, Los Altos, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/061,916

(22) Filed: Mar. 4, 2016

(65) Prior Publication Data

US 2016/0192030 A1    Jun. 30, 2016

Related U.S. Application Data

(62) Division of application No. 13/958,477, filed on Aug. 2, 2013, now Pat. No. 9,319,753.

(Continued)

(51) Int. Cl.
*H04N 21/6587* (2011.01)
*H04N 19/40* (2014.01)
*H04N 21/2187* (2011.01)
*H04N 21/2343* (2011.01)
*H04N 21/2387* (2011.01)
*H04N 21/242* (2011.01)
*H04N 21/845* (2011.01)
*H04N 21/854* (2011.01)

(52) U.S. Cl.
CPC ......... *H04N 21/6587* (2013.01); *H04N 19/40* (2014.11); *H04N 21/2187* (2013.01);
(Continued)

(58) Field of Classification Search
CPC ....... H04N 21/6587; H04N 21/234336; H04N 21/8456; H04N 21/2187; H04N 21/23439;
(Continued)

(56) References Cited

U.S. PATENT DOCUMENTS 8,015,584 B2    9/2011    Breen et al.
8,161,519 B2    4/2012    Krause et al.
(Continued)

*Primary Examiner* — Benjamin R Bruckart
*Assistant Examiner* — Tien M Nguyen
(74) *Attorney, Agent, or Firm* — McDermott Will & Emery LLP

(57) ABSTRACT

A method for performing trick-mode operations with decreased latency for transcode streaming includes receiving and recording a stream of video data. A single transcoder may transcode the stream of video data and generate output video data in an output buffer following. Segmentation index information may be generated that refers to the output data in the output buffer. Skip-backwards, skip-ahead, and resume requests received from a client device are responded by retrieving transcoded video data from the output buffer or retrieving and transcoding video data from an input storage. A method for performing skip-ahead trick-mode operation with decreased latency may use two transcoders such as two threads of the single transcoder to transcode temporally current content and forward content. The forward content may be associated with a forward time offset with respect to the temporally current content. The transcoded forward content is provided in response to skip-ahead trick mode request.

20 Claims, 6 Drawing Sheets

Related U.S. Application Data

(60) Provisional application No. 61/821,633, filed on May 9, 2013.

(52) U.S. Cl.
CPC ... *H04N 21/2387* (2013.01); *H04N 21/23439* (2013.01); *H04N 21/234336* (2013.01); *H04N 21/242* (2013.01); *H04N 21/8456* (2013.01); *H04N 21/85406* (2013.01)

(58) Field of Classification Search
CPC ............ H04N 21/242; H04N 21/2387; H04N 21/85406; H04N 19/40; H04N 21/6583
See application file for complete search history.

(56) References Cited

U.S. PATENT DOCUMENTS

| | | | |
|---|---|---|---|
| 2007/0110398 A1* | 5/2007 | Broeksteeg | G11B 27/105 386/241 |
| 2009/0274212 A1* | 11/2009 | Mizutani | H04N 19/115 375/240.12 |
| 2009/0282444 A1 | 11/2009 | Laksono et al. | |
| 2010/0235542 A1* | 9/2010 | Visharam | G06F 15/16 709/246 |
| 2013/0064283 A1 | 3/2013 | Sun et al. | |
| 2014/0258449 A1 | 9/2014 | Holden et al. | |
| 2014/0282760 A1 | 9/2014 | Prasad Panje et al. | |
| 2014/0337903 A1 | 11/2014 | Zhu et al. | |
| 2014/0380376 A1* | 12/2014 | Schmidt | H04L 65/4084 725/54 |

\* cited by examiner

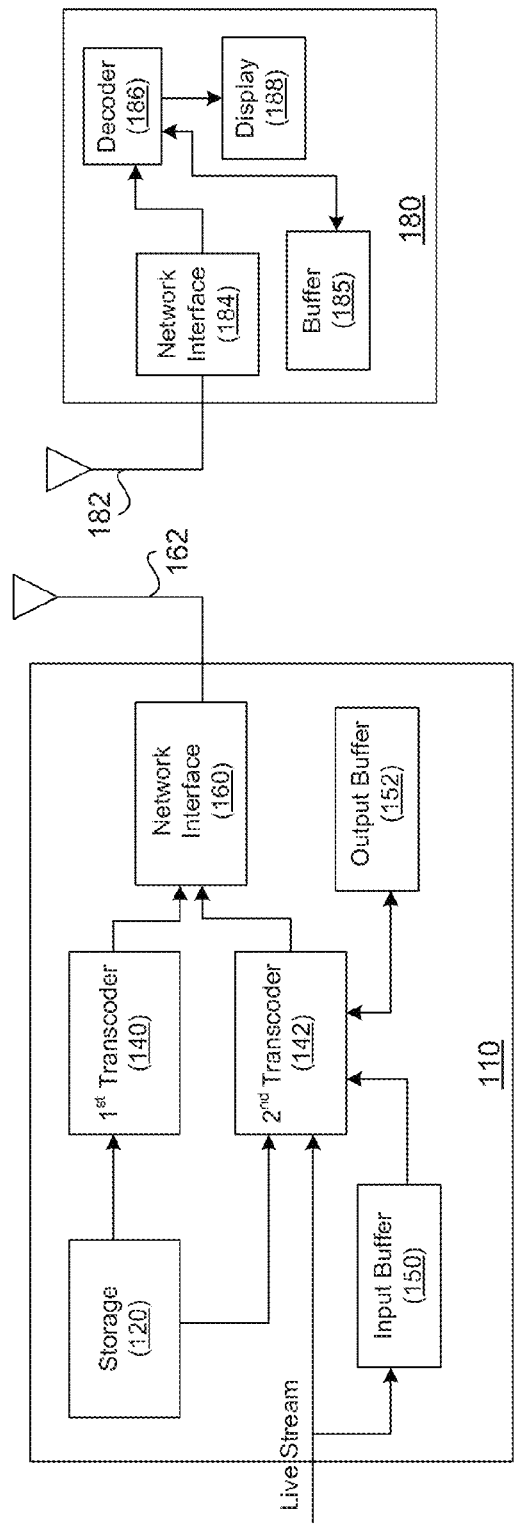

SEAMLESS TRICK-MODE WITH DECREASED LATENCY FOR LIVE TRANSCODE STREAMING

CROSS-REFERENCE TO RELATED APPLICATIONS

This application is a Divisional Application of the U.S. patent application Ser. No. 13/958,477 filed Aug. 2, 2013 and claims the benefit of priority under 35 U.S.C. §119 from U.S. Provisional Patent Application 61/821,633 filed May 9, 2013, which are incorporated herein by reference in their entirety.

TECHNICAL FIELD

The present description relates generally to communications, and more particularly, but not exclusively, to seamless trick-mode with decreased latency for live transcode streaming.

BACKGROUND

Adaptive Bit-Rate (ABR) streaming is a technique used in streaming multimedia over communication networks, for example, the Internet. Some video streaming technologies may utilize streaming protocols such as Real Time Protocol (RTP) with Real Time Streaming Protocol (RTSP). ABR streaming technologies are almost exclusively based on Hyper Text Transport Protocol (HTTP) and are designed to work efficiently over large networks that support HTTP, such as the Internet. The typical ABR streaming technique may have a scheme that partitions a video stream into a sequence of segments with approximately equal durations in presentation timeline.

An ABR stream may be advertised by a streaming server as having multiple representations or profiles, each with different stream characteristics (e.g., including bit rate, resolution, etc.) that may suit different network bandwidth availability or other usage parameters. Each segment of the video stream may have a random access point (e.g., an I-frame) at the start of the segment. When network bandwidth changes, a streaming client may have the option of requesting a new segment of a different profile of the same content. The requested new segment typically represents content that is contiguous to the preceding segment and a set of consecutive segments may be presented smoothly. The typical ABR streaming server may prepare and transcode the multiple representations or profiles of the streams offline for streams available in the storage, so when client requests different profiles of stream, ABR streaming server may retrieve the already transcoded video data and transmit accordingly. However, this requires extra storage with ABR server for the transcoded multiple profiles of the same stream content; and the offline transcode does not work with content received from live broadcast sources. If the transcode can be performed online while live streaming, server may save significant storage and could offer ABR streaming service with live broadcast source. When live transcode streaming is performed, there are some challenges with how trick mode features are supported for ABR streaming service. This application will address the seamless trick mode support with decreased latency for live transcode streaming. Some of the technique in this specification may also apply to the offline transcode to prepare for trick mode features with the ABR streaming service.

BRIEF DESCRIPTION OF THE DRAWINGS

Certain features of the subject technology are set forth in the appended claims. However, for purpose of explanation, several embodiments of the subject technology are set forth in the following figures.

FIGS. 1A and 1B illustrate examples of an ABR server for performing seamless trick-mode operations for transcode streaming and a client device, in accordance with one or more implementations.

DETAILED DESCRIPTION

Figure 2A:
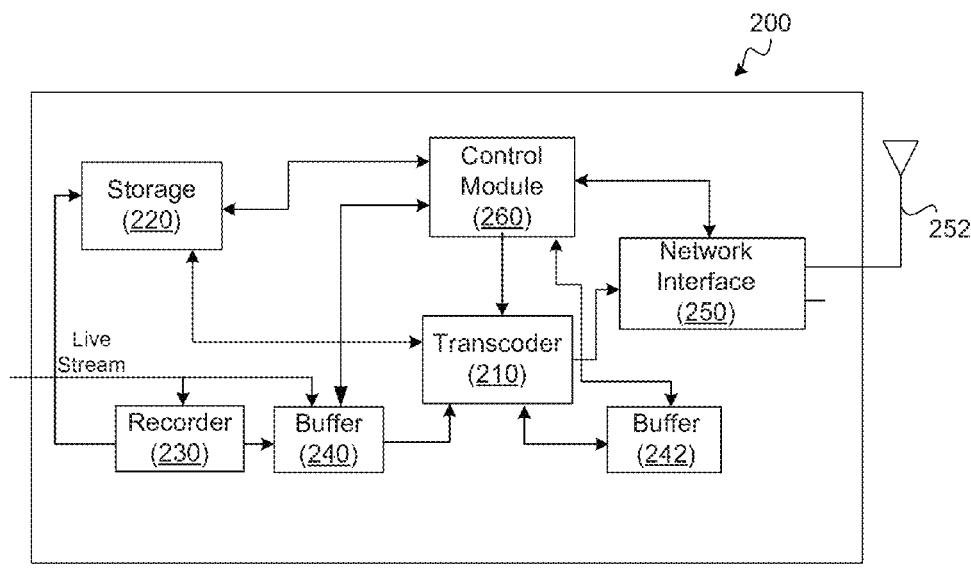
FIG. 2A illustrates an example of an ABR server for performing seamless pause/resume and/or trick-mode operations, in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

The subject technology includes a number of advantageous features that can substantially surpass the existing solutions in terms of performance, speed, and user experience. For example, the disclosed subject matter provides seamless skip-backwards trick-mode, pause and resume and skip-ahead trick-mode with decreased latency for live transcode streaming of adaptive bit-rate (ABR) content, as described in greater details herein.

FIGS. 1A and 1B illustrate examples of an ABR server 110 for performing seamless trick-mode operations for transcode streaming and a client device, in accordance with one or more implementations of the subject technology. The ABR server 110 includes a first transcoder 140, a second transcoder 142, an input buffer 150, an output buffer 152, a storage device 120 (e.g., digital video recorder (DVR), disk drive, flash memory, dynamic random access memory (DRAM), or other memory), a network interface 160, and an antenna 162. The client device 180 includes an antenna 182, a network interface 184, a buffer 185, a decoder 186, and a display 188. Examples of the ABR server 110 may include a remote server, a home or enterprise gateway, or a set-top box (STB). Examples of the client device 180 may include a television set, a computer display, or a hand-held communication device such as a laptop, a tablet, a mobile phone, etc.

In one or more implementations of the subject technology, a single transcoder such as the second transcoder 142 may receive, from a source (e.g., the storage device 130 or a live source), a stream of video data. The stream of video data may be recorded in an input buffer 150 (e.g., a video buffer) that can store a predetermined amount of video data (e.g., equivalent of 30 sec or more of video data). The input buffer 150 may delay the received stream of video data by a predetermined amount of time, for example 30 seconds. The stream of video data may be transcoded by the second transcoder 142. The second transcoder 142 may generate a transcoded video stream including multiple transcoded video segments with an output segment size (e.g., 2-10 sec). Some segments of the transcoded video segments may be stored in an output video buffer (e.g., a video buffer) 152. In response to a skip-backwards request from the client device 180, skipping backwards may be performed by retrieving, from the output buffer 152, transcoded video data based on segment request information received from the client device 180 if video data corresponding to the segment request information associated with the skip-backwards request are available from the output buffer 152. Otherwise, recorded video data may be retrieved from a first storage. In some aspects, the first storage may be the input buffer 150 or may be a different storage such as the storage 120. The server 110 may record the stream of video data in parallel both in the input buffer and the storage 120 if the source is a live source. The first storage (e.g., storage 120) may be capable of storing more video data than the input buffer 150. In one or more aspects, if the source of the video stream is a stored source such as storage 120, the server 110 may respond to the skip-backwards request by retrieving the recorded video data from the storage 120. The retrieved data from the first storage may be transcoded by the transcoder 142 and provided, via the network interface 160, to the client 180.

In one or more implementations of the subject technology, the transcoded video data may be generated based on segment request information received from the client device 180. In one or more implementations, the segmentation boundary markers may be inserted in the stream of video data fed to the transcoder 142. The transcoder 142 may start a random access picture in the stream of video data where a segmentation boundary marker is encountered. The output video data may be generated by lining up segments of the output video data with input video segments in time domain. The segmentation index information may be generated based on random access pictures.

In one or more implementations of the subject technology, the ABR server 110 may be configured to perform a quick (e.g., with decreased latency) skip-ahead trick-mode operation. For example, the first transcoder 140 may receive, from the storage device 120, a stream of video data. The first transcoder 140 may transcode the received stream of video data, as temporally current content. Forward content, which is associated with a predetermined forward time offset with respect to the temporally current content, may be retrieved from the storage device 120. The second transcoder 142 may transcode the forward content. The transcoded temporally current content may be provided to the client device 180 via the network interface 160.

In one or more aspects, a skip-ahead trick-mode request (e.g., for a 30 sec skip-ahead), may be received from the client device 180. In response to the skip-ahead trick-mode request, an output of the second transcoder 142 may be provided to the client device 180. Afterwards, the first transcoder may be reassigned to transcode a new forward content, which is associated with the forward time offset with respect to the output of the second transcoder.

The client device 180 may receive a manifest file from the ABR server 110, which advertises various profiles associated with the data stream (e.g., video stream) transmitted by the ABR server 110. Each profile may include one or more characteristics, including, a bit rate, a frame rate, a segment information (e.g., segment size), etc. The client device 180, at certain times and based on the condition of the performance of the network (e.g., home network), may request a specific advertised profile. The ABR server 110 may respond to the request by providing segments corresponding to the requested profile to the client device 180. The client device 180 may receive the transmitted video stream, store a portion of a segment or one or more segments of the video stream in a buffer 185, decode the received video stream using the decoder 186 and display the decoded stream on the display device 188.

FIG. 2A illustrates an example of an ABR server 200 for performing seamless pause/resume and/or trick-mode operations, in accordance with one or more implementations of the subject technology. The ABR server 200 may include a transcoder 210, a storage device 220, a recorder module 230, a network interface 250, an antenna 252, a control module 260, an input buffer 240, and an output buffer 242. The transcoder 210 may be configured by the control module 260 to receive a stream of video data from the storage device 220 or a live stream from a source external to the ABR server 200 via input buffer 240. The network interface 250, along with the antenna 252, may perform communications with other devices, such as ABR client devices (e.g., 180 of FIG. 1). The communications may include receiving requests for segment corresponding to one or more ABR profiles, requests for resume, skip-backwards, skip-ahead, and other messages or data and transmitting manifest files, and video data in response to various requests from the other devices. Requests for resume, skip-backwards and skip-ahead may be in the form of requests for segments. For example, segments representing various presentation times of a video stream may be described in a manifest. Alternatively, requests for resume, skip-backwards and skip-ahead may be in the form of explicit requests for those functions. The ABR server 200 may transmit video without the use of segments.

The live stream may be recorded by the recorder module 230 in the input buffer 240, which can store a predetermined amount of video data (e.g., equivalent of 30 sec or more of video data). In some aspects, the recorder module 230 may store the live stream in the storage device 220, which may include a DVR, a hard drive, flash memory or other memory that can store substantial amount of video data (e.g., one or more video files such as movies). At any moment of time, the input buffer 240 may hold the most recent portion (e.g., the last 30 sec) of the live stream. The transcoder 210 may transcode the received stream of video data and organize the transcoded stream in segments, each of which has a size (e.g., 2-10 sec). The transcoded segments may be stored in the output buffer 242, which can store a limited amount of video data (e.g., equivalent of 30 sec or more). In some aspects, the recorder module 230 may optionally store the data from output buffer into the storage device for an extra amount of video data (e.g., 5 or more minutes) as well when output buffer is full and treat the output storage as a part of output buffer. In some aspects, the control module 260 may generate segmentation index information in an output index buffer, which may be a part of the output buffer 242. The control module 260 may generate the segmentation index information based on segment boundary information recorded in the input buffer 240, recorder 230, storage 220, or in another storage. At any moment of time, the output buffer 242 may hold the most recent portion (e.g., the last 30 sec) of the transcoded video data. The most recent portion of transcoded video data may be organized into segments based on the segmentation index information generated by the index module.

The control module 260 may respond to a skip-backward request, received by the network interface 250 from a client device, by retrieving transcoded video data from the output buffer 242, based on segment request information received from the client device (e.g., 180 of FIG. 1B) if video data corresponding the segment request information associated with the skip-backwards request are available from the output buffer 242. Otherwise, the control module 260 may retrieve the recorded video from a first storage that may include the input buffer 240, and direct the retrieved video data to the transcoder 210 for transcoding and providing to the client device via the network interface 250. In one or more aspects, if the corresponding video data associated with the skip-backwards request is not available from the input buffer 240, the control module 260 may retrieve the retrieve video data associated with the skip-backwards request from the storage device 220 and provide the retrieved video data to the transcoder 210 for transcoding and providing to the client device.

In one or more implementations of the subject technology, the control module 260 may respond to a resume request received from the client device 180 by retrieve from the output buffer 242, video data that corresponds to a start of a pause period, if the video data is available from the output buffer 242. Otherwise, the control module 260 may retrieve video data that corresponds to the start of the pause period from the input buffer 240, or the storage 220, and cause the transcoder 210 to transcode the retrieved video data that corresponds to the start of the pause period. In one or more implementations of pause/resume feature, if the source content is from file storage, a non-real-time (NRT) mode transcoder end-to-end flow control may be used to support a seamless pause/resume function. For example, when client device 180 pauses, the output buffer 242 will eventually become full, which will back pressure the transcoder to pause. The control module can pause feeding transcoder with video data when that occurs. When client resumes to request data, the output buffer 242 will resume to be consumed, the transcoder would resume operation and control module then can resume feeding data to the transcoder. In one or more implementations if above flow-control based method is not used, for example, when the client device 180 pauses, the fullness of the output buffer 242 can keep growing beyond the buffer capacity. In this case, an application may store the output data to a separate storage file (e.g., recorder 230 or storage 220, or in another storage). When client resumes, the server may continue from where it stopped from the output buffer or output storage. In one or more implementations, if the input is live, when output pauses, unstopped transcoder 210 may drop video when output buffer 242 is full. In that scenario, the whole input stream of video data can be recorded to file storage (e.g., recorder 230, storage 220, or another storage) for later resume usage in case pause is longer than the storage capacity of the input buffer 240. In other words, when the input buffer 240 is implemented as a time-shift file, it should support dynamical growing storage size when reaching fullness to tolerate the long duration of downstream pause. The control module 260 may also insert the corresponding segment boundary information as in-band marker at beginning of each intended segment of input video data that is fed to the transcoder during transcoding, wherein the segmentation boundary markers are based on the segmentation index data (which is based on random access point in the video stream) generated by the recorder module 230 when receiving video for live source, or based on the segmentation index data generated by indexing the file storage source offline. The segmentation index information is also generated in an output index buffer (e.g., in the output buffer 242) when transcoder generates the output video data into the output buffer 242. The output segmentation index data may be lined up in presentation time domain based on the method described below.

A skip-ahead trick-mode request may be fulfilled by the ABR server 200 if forward data is available. This may be the case if the source of the video data is a stored source (e.g., storage device 220). In this case, the control module 260 may retrieve transcoded video data associated with the skip-ahead request from the output buffer 242, based on segment request information received from the client device if transcoded video data associated with the skip-ahead request are available from the output buffer 242. Otherwise, the control module 260 may retrieve recorded video data from the input storage (e.g., buffer 240, storage 220, or other storage) and cause the transcoder 210 to transcode retrieved recorded video data. The control module 260 may further retrieve the transcoded video segments associated with the skip-ahead request if segment information associated with the skip-ahead request is found from segment boundary information associated with the input storage. The segment information associated with the skip-ahead request may include a segment identifier advertised to the client device.

Figure 2B:
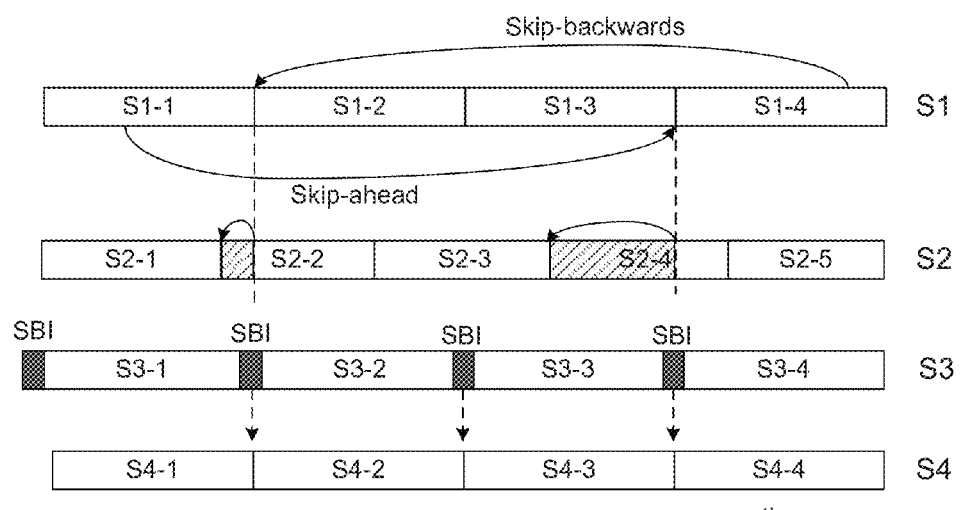
FIG. 2B illustrates timing diagrams depicting transcoded and input video segments in existing systems as well as the ABR server of FIG. 2A, in accordance with one or more implementations.

FIG. 2B illustrates time diagrams depicting transcoded and input video segments in existing systems as well as the ABR server of FIG. 2A, in accordance with one or more implementations. An existing ABR file streamer may have multiple bit rate profiles from a single portion of content transcoded off-line ahead of time and ready for use as multiple representations for online ABR streaming service later. A drawback of the offline transcode scheme is that the supported bit rate profiles may be pre-determined, limited, and not changeable on the fly, therefore taking more storage space (e.g., for storing multiple copies of video content in different bit rates including the original bit rate). For example, in the existing systems, a transcoder may transcode a portion of input video data by providing a portion of transcoded output video data that may have a certain segment structure, for instance, characteristics such as segment size (e.g., 2-10 sec), as seen in diagram S1. The segmentation of the transcoded output video data may not correspond to the segmentation shown in diagram S2 that may correspond to the input stream of video data. This may be problematic when attending to skip-ahead and skip-backwards requests. For example, when responding to a skip-backward request, as shown in diagrams S1 and S2, since the segment boundaries in S1 and S2 are not aligned, the skip-backwards may end up somewhere inside the segment S2-2 of the diagram S2. However, in order to access any frame in segment S2-2 the decoder portion of the transcoder may have to retrieve the segment from the start of the segment S2-2 and decode the input. Similarly, in response to a skip-ahead request the skip-ahead video may start at S1-4 of output video segment which requires restarting transcoder from the segment S2-4 of the diagram S2. Again, the transcoder may have to retrieve the entire video data included in the segment S2-4 from the beginning of the segment S2-4 and decode from the start of the segment S2-4 until reaching a frame (or picture), from which the transcoded output video has to start, and start transcoding from that frame. The decoding of the unwanted portion of segment S2-4 takes transcoder time and may result in latency.

In one or more implementations of the subject technology, to support live transcode streaming, a lineup method may line up segments of the output video data (e.g., S4) with segments in the input video stream fed to the transcoder (e.g., S3). As a result, the skip-back or forward or random access into the video content requested by client may always be lined up with the input video stream fed to the transcoder input. This saves some of overhead and latency for both profile switching and trick-mode random access operations. For example, in the case where the source video data is already segmented, the segment boundary information may be recorded in an input index file that can be a part of the input buffer 240 or stored elsewhere. The control module 260 may insert segmentation boundary marker based on random access pictures, which are inserted by the transcoder 210 wherever a segmentation boundary marker is encountered. The segmentation boundary markers may be inserted in the stream of video data fed to the transcoder. When transcoder sees the in-band segmentation marker, it may start a new random access picture in the transcode output video. And the output buffer indexing would generate the output segment index information based on the output video random access pictures, which are actually lined up with the input intended segmentation boundaries in presentation time. The disclosed lineup method can help to support trick-mode random access (e.g., skip-forward and skip-backwards) by reducing latency and overhead, as compared to the existing methods described above.

Figure 3:
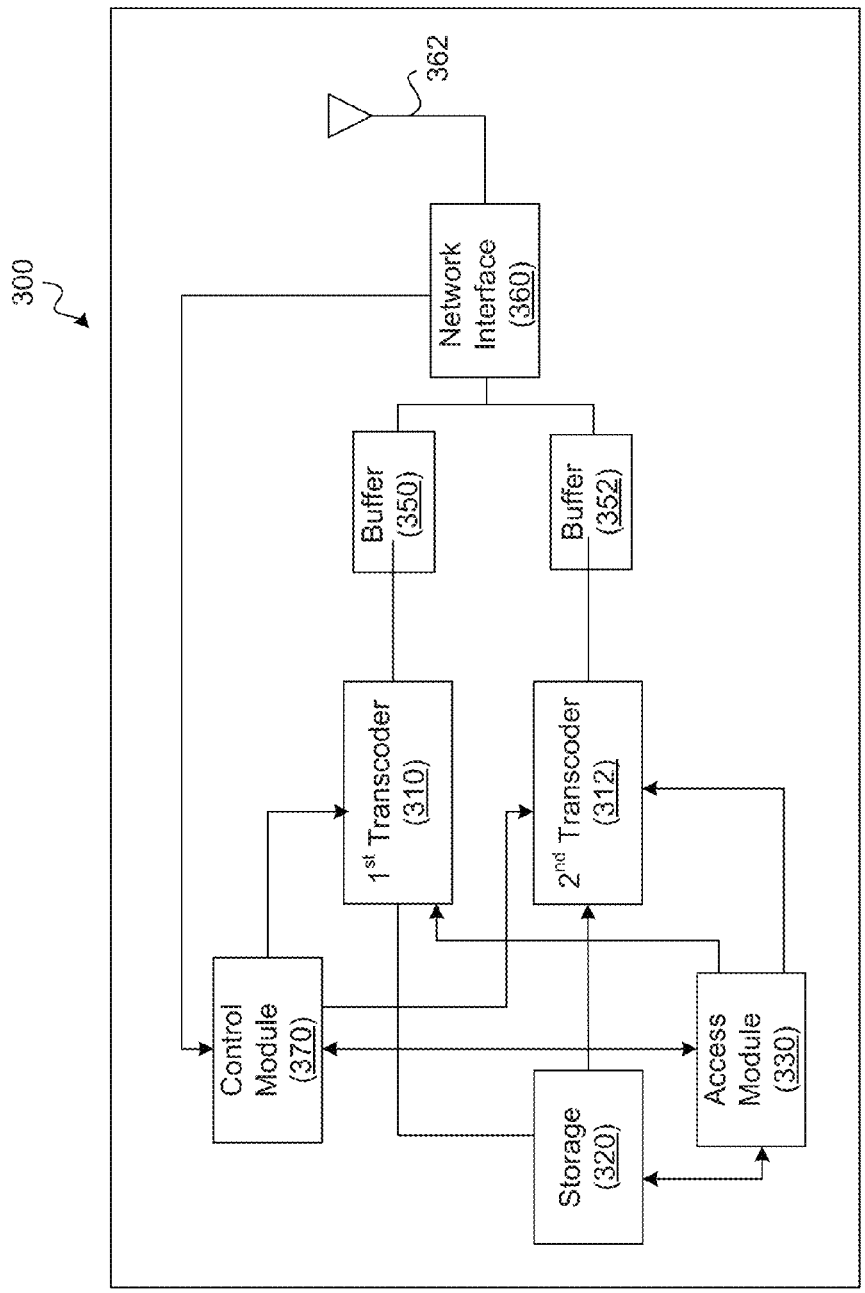
FIG. 3 illustrates an example of an ABR server for performing seamless skip-ahead trick-mode with decreased latency for live stream transcoding, in accordance with one or more implementations.

FIG. 3 illustrates an example of an ABR server 300 for performing seamless skip-ahead trick-mode with decreased latency for live stream transcoding, in accordance with one or more implementations. The ABR server 300 may include first and second transcoders 310 and 312, a storage device 320, an access module 330, output buffers 350 and 352, a network interface 360, an antenna 362, and a control module 370. The network interface 360, along with the antenna 362, may perform communications with other devices, such as ABR client devices (e.g., 180 of FIG. 1). The communications may include receiving requests for skip-ahead and other messages or data and transmitting video data in response to various requests from the other devices. In one or more implementations, the first and second transcoders 310 and 312 may not be two separate pieces of hardware and may comprise two threads of a single physical transcoder.

The ABR server 300 may be configured to perform a quick (e.g., with decreased latency) skip-ahead trick-mode operation. In some aspects, the first transcoder 310 may receive, from the storage device 320, a stream of video data. The first transcoder 310 may transcode the received stream of video data, as temporally current content. The access module 330 may provide the second transcoder 312 with forward content, which may be associated with a predetermined forward time offset (e.g., 30 sec or more) with respect to the temporally current content. The access module 330 may retrieve the forward content from the storage device 320. While the second transcoder 312 is transcoding the forward content, the output of the first transcoder 310 can be provided through the output buffer 350 to the network interface 360.

When a skip-ahead trick-mode request (e.g., for a 30 sec skip-ahead) is received from a client device (e.g., the client device 180 of FIG. 1) by the network interface 360, the control module 370 is informed of the request. In response to the request, the control module 370 may invoke the access module 330 to cause the second transcoder 312 to provide the forward content through the output buffer 352 to the network interface 360. At this point, the control module 370 may invoke the access module 330 to retrieve, from the storage device 320, a new forward content, which is associated with a forward time offset (e.g., 30 sec) with respect to the output of the second transcoder 312 and provide the retrieved data to the first transcoder 310. At the same time, the control module 370 may reassign the first transcoder 310 to transcode the new forward content, and the transcoded output of the first transcoder 310 is directed to the output buffer 350.

Similarly, in subsequent (e.g., future) skip-ahead trick-mode requests, the first and second transcoders 310 and 312 may take turn in transcoding the future temporally current and forward content, and provide the transcoded future temporally current and forward content to output buffers 350 and 352, respectively. Each of the output buffers 350 and 352 may hold up to a predetermined amount of video data (e.g., at least two segments) while the buffer output is not transmitted, in order to be prepared for a response to a future request with low latency. An advantage of having the output buffers 350 and 352 is that the ABR server 300 may provide the buffered content right after receiving the skip-ahead request, so that the decoder of the client device can have at least a first segment of the video data to process in a substantially short time after a skip-ahead request, without waiting for either transcoder 310 or 312 to begin transcoding the requested data. Furthermore, having an unselected one of the output buffers 350 and 352 be pre-filled with enough data can enable the decoder to start decoding and displaying as soon as the data is transmitted to the receiver. In one or more implementations, the content of the output buffers 350 and/or 352 (e.g., one or two segments) can be transmitted to the client device as quickly as the network can support the transmission, so that the client device can begin decoding the video data received in response to a request (e.g., skip ahead) with minimal latency.

Figure 4:
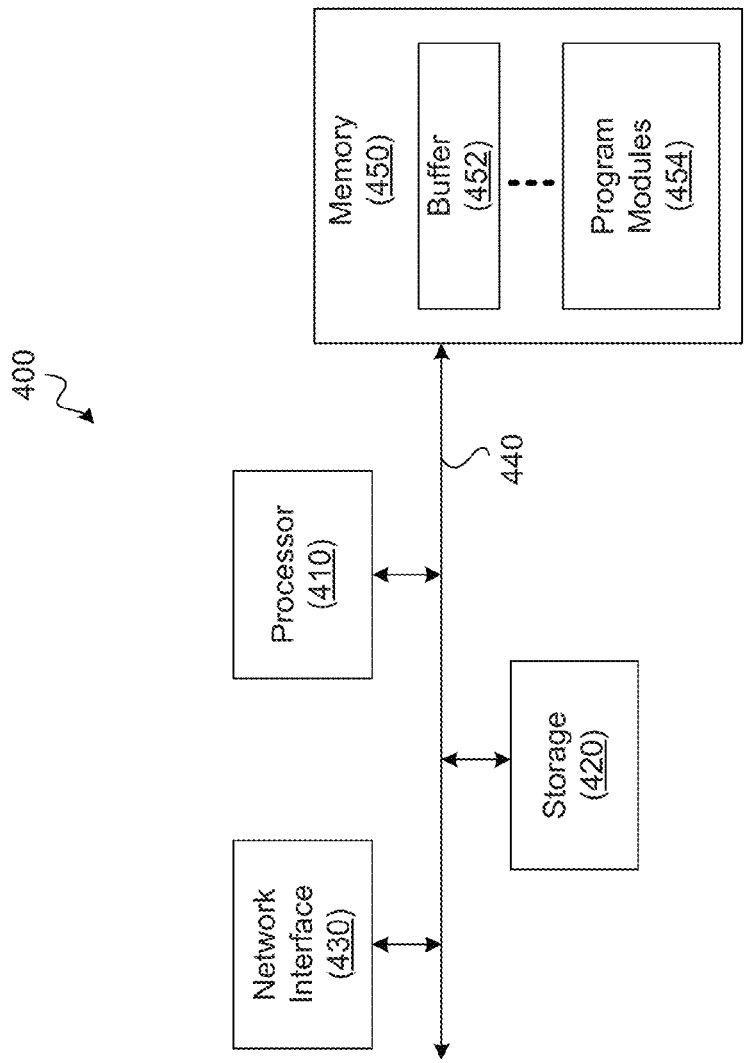
FIG. 4 illustrates an example of an ABR server for performing seamless trick-mode with decreased latency for live transcode streaming, in accordance with one or more implementations.

FIG. 4 illustrates an example of an ABR server 400 for performing seamless trick-mode with decreased latency for live transcode streaming, in accordance with one or more implementations. The server 400 may include a processor 410, a storage device 420, a network interface 430, and memory 450, coupled to one another via a bus 440. The processor may include a number of hardware cores that can perform various functionalities, such as transcoding, scaling, and/or other video/audio processing operations. The network interface 430 may perform communications with other devices, such as ABR client devices (e.g., 180 of FIG. 1). The communication may include receiving a request for an ABR profile, requests for pause, resume, skip-backwards, skip-ahead, and other messages or data and transmitting manifest files, and video data in response to various requests from the other devices. The memory 350 may include RAM, DRAM, static RAM (SRAM), flash memory, etc. The storage device 420 may include a DVR, a disk drive, flash memory, DRAM, or other types of memory.

The memory 450 may include a number of buffers such as a buffer 452 (e.g., video buffers) and a number of program modules that can be executed by the processor 410. The program modules may perform the functionalities of the control modules described above with respect to ABR servers 200 and 300 of FIGS. 2 and 3, respectively. In one or more implementations, the program modules may reside in a storage device such as storage 420 or may reside in the processor 410.

Figure 5:
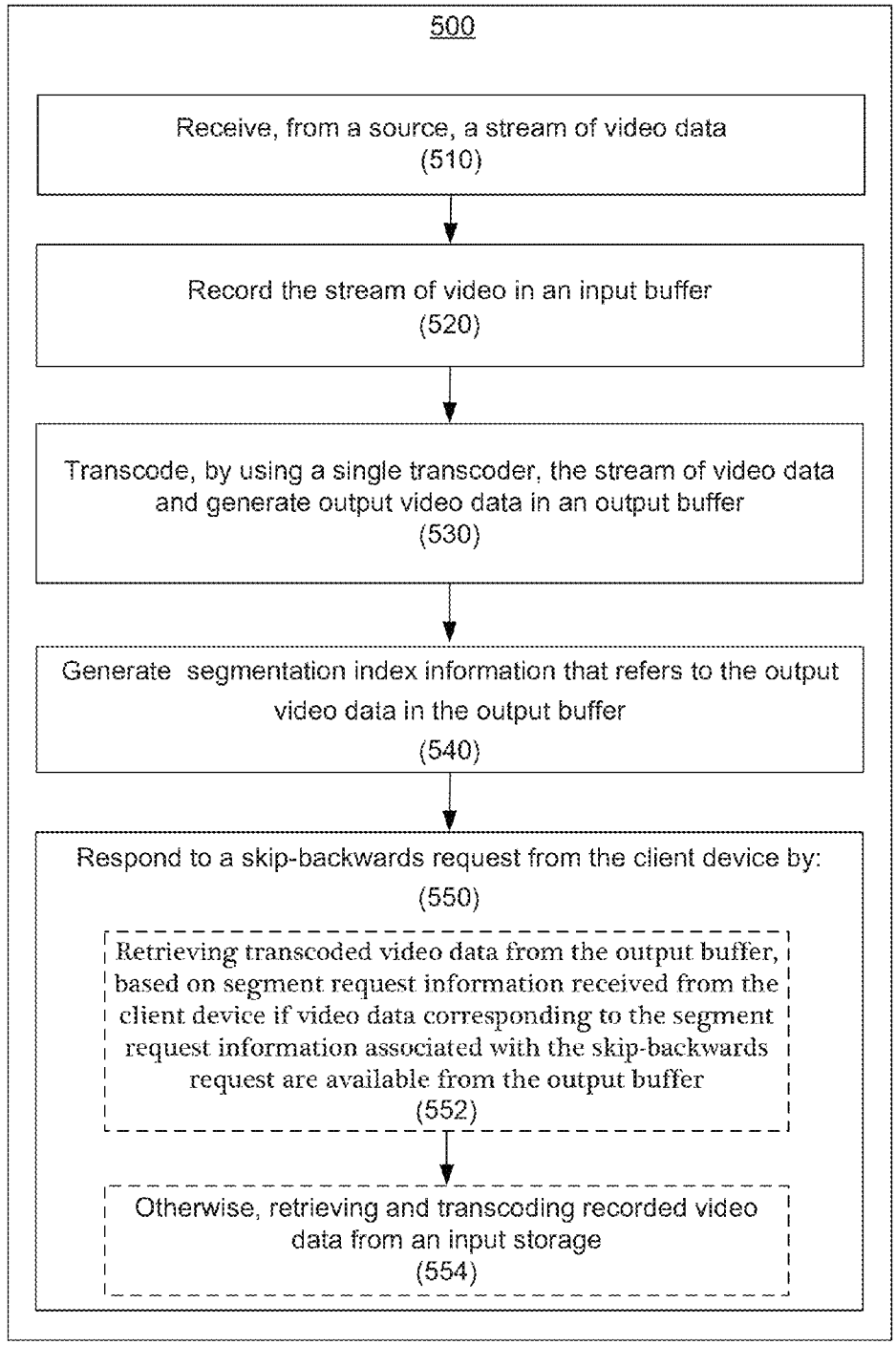
FIG. 5 illustrates an example of a method for seamless trick-mode operations with decreased latency for transcode streaming, in accordance with one or more implementations.

FIG. 5 illustrates an example of a method 500 for performing seamless trick-mode with decreased latency for live transcode streaming in an ABR server (e.g., 200 of FIG. 2A), in accordance with one or more implementations. A stream of video data may be received, from a source (e.g., an external source or 220 of FIG. 2A) (510). The stream of video data may be recorded (e.g., by using 230 of FIG. 2A), in an input buffer (e.g., 240 of FIG. 2A) (520). The stream of video data may be transcoded by a transcoder (e.g., 210 of FIG. 2A) following the lineup method described earlier, and output video data may be generated, for example, in an output buffer (e.g., 242 of FIG. 2A) (530). Segmentation index information may be generated that refers to the output video data in the output buffer. In some aspects, the segmentation index information may be generated in an output index buffer (e.g., as a portion of 242 of FIG. 2A) (540). The segmentation index information associated with the input video stream may be generated when the input video stream recorded. A skip-backwards request from the client device may be responded to (550) by: retrieving transcoded video data (e.g., by 260 of FIG. 2A) from the output buffer, based on segment request information received from the client device (e.g., 180 of FIG. 1B) if video data corresponding to the segment request information associated with the skip-backwards request are available from the output buffer. (552); otherwise, retrieving and transcoding recorded video data from the input storage (e.g., 240 or 220 of FIG. 2A) (554).

Figure 6:
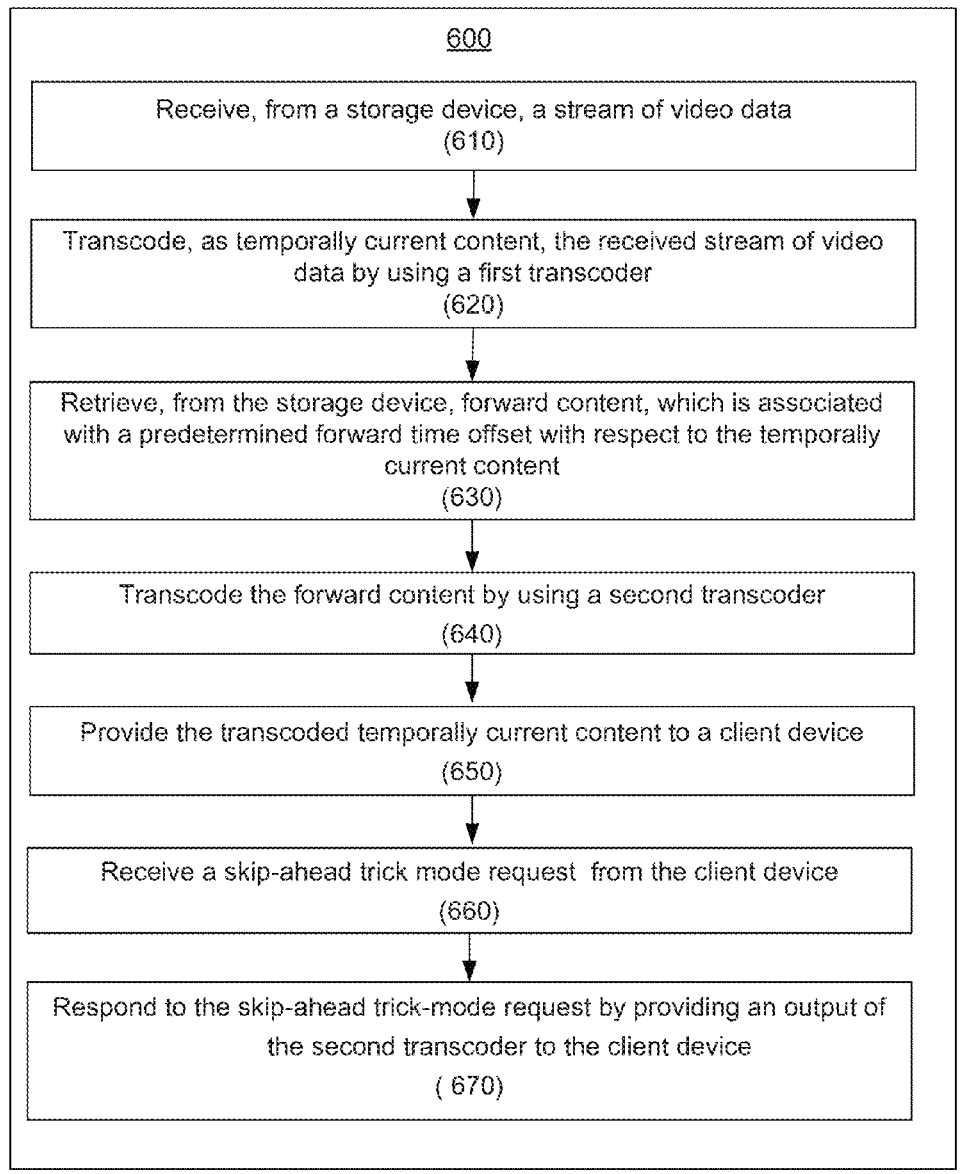
FIG. 6 illustrates an example of a method of performing seamless trick-mode with decreased latency for live transcode streaming in an ABR server, in accordance with one or more implementations.

FIG. 6 illustrates an example of a method 600 for performing a seamless skip-ahead trick-mode with decreased latency for transcode streaming in an ABR server, in accordance with one or more implementations. A stream of video data may be received from a storage device (e.g., 320 of FIG. 3) (610). The received stream of video data may be transcoded, as temporally current content, by using a first transcoder (e.g., 310 of FIG. 3) (620). Forward content, which is associated with a predetermined forward time offset with respect to the temporally current content, may be retrieved from the storage device (630). The forward content may be transcoded by using a second transcoder (e.g., 312 of FIG. 3) (640). In one or more implementations, the first and second transcoders may be threads of a single transcoder. The transcoded temporally current content may be provided to a client device (e.g., 180 of FIG. 1B) (650). A skip-ahead trick-mode request may be received from the client device (660). The skip-ahead trick-mode request may be responded to by providing an output of the second transcoder to the client device (670).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for decreased latency during a skip-ahead trick-mode operation, the method comprising:
   receiving, from a storage device, a stream of video data;
   transcoding, as temporally current content, the received stream of video data by using a first transcoder;
   retrieving, from the storage device, forward content, which is associated with a predetermined forward time offset with respect to the temporally current content;
   transcoding the forward content by using a second transcoder to generate a second transcoder output;
   providing the transcoded temporally current content to a client device;
   receiving a skip-ahead trick-mode request from the client device;
   responding to the skip-ahead trick-mode request by providing an output of the second transcoder to the client device; and
   retrieving from the storage device a new forward content associated with a first forward time offset with respect to a time associated with the second transcoder output and assigning the first transcoder to transcode the new forward content.

2. The method of claim 1, wherein the new forward content is associated with a first instance of time that is after an instance of time associated with the forward content.

3. The method of claim 1, further comprising buffering an output of the first transcoder and the output of the second transcoder before being provided to the client device, wherein buffered content comprises a predetermined amount of video data.

4. The method of claim 3, further comprising providing the buffered content to the client device at a speed higher than normal real time speed.

5. The method of claim 3, wherein retrieving from the storage device comprises retrieving from a digital video recorder (DVR), a disk drive, a flash memory, or a dynamic random access memory (DRAM).

6. The method of claim 1, wherein the predetermined forward time offset with respect to the temporally current content is set by the skip-ahead trick-mode request received from the client device.

7. The method of claim 1, wherein providing the output of the second transcoder to the client device is performed by a controller and through a network interface.

8. A device for decreased latency during a skip-ahead trick-mode operation, the device comprising:
   a storage device to store a stream of video data;
   a first transcoder to transcode, as temporally current content, a received stream of video data;
   a controller to retrieve, from the storage device, forward content that is associated with a predetermined forward time offset with respect to the temporally current content;
   a second transcoder to transcode the retrieved forward content and to generate a second transcoder output;
   a network interface to provide the transcoded temporally current content to a client device;
   an access block to retrieve from the storage device a new forward content associated with a first forward time offset with respect to a time associated with the second transcoder output; and
   the controller to assign the first transcoder to transcode the new forward content,
   the controller is further to:
      receive a skip-ahead trick-mode request from the client device; and
      respond to the skip-ahead trick-mode request by providing an output of the second transcoder to the client device.

9. The device of claim 8, wherein the new forward content is associated with a first instance of time that is after an instance of time associated with the forward content.

10. The device of claim 8, further comprising a first output buffer to store an output of the first transcoder before being provided to the client device.

11. The device of claim 8, further comprising a second output buffer to store an output of the second transcoder before being provided to the client device.

12. The device of claim 11, wherein the second output buffer is to provide buffered content to the client device at a speed higher than a normal real time speed.

13. The device of claim 8, wherein the controller is to provide the output of the second transcoder to the client device through the network interface.

14. The device of claim 8, wherein the predetermined forward time offset with respect to the temporally current content is set by the skip-ahead trick-mode request received from the client device.

15. The device of claim 8, wherein the storage device comprises one of a digital video recorder (DVR), a disk drive, a flash memory, or a dynamic random access memory (DRAM).

16. A system for providing decreased latency during a trick-mode, the system comprising:
   memory to store one or more program modules;
   one or more processors coupled to the memory, the one or more processors to execute the one or more program modules to:
      receive, from a storage device, a stream of video data;
      transcode, as temporally current content, the received stream of video data by using a first transcoder;
      retrieve, from the storage device, forward content, which is associated with a predetermined forward time offset with respect to the temporally current content;
      transcode the forward content by using a second transcoder to generate a second transcoder output;
      provide the transcoded temporally current content to a client device;
      receive a skip-ahead trick-mode request from the client device;
      respond to the skip-ahead trick-mode request by providing an output of the second transcoder to the client device; and
      retrieve from the storage device a new forward content associated with a first forward time offset with respect to a time associated with the second transcoder output and assign the first transcoder to transcode the new forward content.

17. The system of claim 16, wherein the new forward content is associated with a first instance of time that is after an instance of time associated with the forward content.

18. The system of claim 16, wherein the one or more processors is further to execute the one or more program modules to buffer an output of the first transcoder and the output of the second transcoder before being provided to the client device, wherein buffered content comprises a predetermined amount of video data.

19. The system of claim 18, wherein the one or more processors is further to execute the one or more program modules to provide the buffered content to the client device at a speed higher than normal real time speed.

20. The system of claim 16, wherein the storage device comprises one of a digital video recorder (DVR), a disk drive, a flash memory, or a dynamic random access memory (DRAM).

* * * * *